United States Patent
McEntee et al.

(10) Patent No.: US 7,112,305 B2
(45) Date of Patent: Sep. 26, 2006

(54) AUTOMATION-OPTIMIZED MICROARRAY PACKAGE

(75) Inventors: John F. McEntee, Boulder Creek, CA (US); Jay K. Bass, Mountain View, CA (US); Roy H. Kanemoto, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 841 days.

(21) Appl. No.: 09/775,375

(22) Filed: Jan. 31, 2001

(65) Prior Publication Data

US 2002/0102186 A1  Aug. 1, 2002

(51) Int. Cl.
*B01L 3/00* (2006.01)

(52) U.S. Cl. .................... 422/102; 422/99; 422/100; 422/104; 436/174; 436/180; 206/701; 206/710; 206/712; 206/713; 206/714

(58) Field of Classification Search ............... 422/102, 422/99, 58–61; 206/449–456
See application file for complete search history.

(56) References Cited

U.S. PATENT DOCUMENTS

| | | | | |
|---|---|---|---|---|
| 2,758,710 A | * | 8/1956 | Arens ........................... 221/25 |
| 3,700,089 A | * | 10/1972 | Halbartschlager et al. .. 198/449 |
| 3,912,081 A | * | 10/1975 | Haines et al. ................ 206/531 |
| 3,921,802 A | * | 11/1975 | Thompson ................... 206/225 |
| 3,924,746 A | * | 12/1975 | Haines ......................... 206/530 |
| 4,169,531 A | * | 10/1979 | Wood ........................... 206/531 |
| 4,328,184 A | * | 5/1982 | Kondo .......................... 422/58 |
| 4,434,893 A | * | 3/1984 | Barlow ........................ 206/522 |
| 4,448,306 A | * | 5/1984 | Sinnadurai et al. .......... 206/725 |
| 4,494,902 A | * | 1/1985 | Kuppens et al. .............. 221/74 |
| 4,867,308 A | * | 9/1989 | Crawford et al. ............ 206/714 |
| 4,883,197 A | * | 11/1989 | Sanchez et al. ................ 221/26 |
| 5,101,975 A | * | 4/1992 | Runyon et al. ............. 206/713 |
| 5,103,976 A | * | 4/1992 | Murphy ....................... 206/719 |
| 5,131,535 A | * | 7/1992 | O'Connor et al. .......... 206/722 |
| 5,246,129 A | * | 9/1993 | Small et al. ................. 220/23.4 |
| 5,361,901 A | * | 11/1994 | Schenz et al. .............. 206/714 |
| 5,413,761 A | * | 5/1995 | Dulaney ....................... 422/56 |
| 5,526,935 A | * | 6/1996 | Tidemann et al. .......... 206/713 |
| 5,599,695 A | | 2/1997 | Pease et al. |
| 5,648,136 A | * | 7/1997 | Bird ............................. 428/76 |
| 5,720,924 A | * | 2/1998 | Eikmeier et al. ........... 422/102 |
| 5,731,230 A | * | 3/1998 | Nevill et al. .................. 438/15 |
| 5,753,788 A | | 5/1998 | Fodor et al. |

(Continued)

FOREIGN PATENT DOCUMENTS

JP       04-9666      *   1/1992

(Continued)

OTHER PUBLICATIONS

Two abstracts for JP 4-9666.*

(Continued)

*Primary Examiner*—Jill Warden
*Assistant Examiner*—Dwayne K. Handy (57) ABSTRACT

A method and system for economically packaging microarrays into sealed reaction chambers and storage vessels. A pocket strip is manufactured as a linear sequence of pockets, or wells, into which microarrays are positioned. A cover strip is then heat sealed to the upper surface of the pocket strip to create a linear sequence of sealed reaction chambers or storage vessels each containing a microarray. Mechanical features or optical features are included along the length of the pocket strip to facilitate mechanical translation and positioning of microarrays embedded within the microarray strip. Septa are affixed to, or embedded within, the cover strip to provide resealable ports through which solutions can be introduced into, or extracted from, the reaction chambers.

23 Claims, 4 Drawing Sheets

U.S. PATENT DOCUMENTS

| | | | |
|---|---|---|---|
| 5,770,860 A * | 6/1998 | Franzen | 250/288 |
| 5,848,703 A * | 12/1998 | Murphy et al. | 206/725 |
| 5,880,829 A * | 3/1999 | Kauhaniemi et al. | 356/246 |
| 5,927,503 A * | 7/1999 | Nevill et al. | 206/701 |
| 6,083,763 A * | 7/2000 | Balch | 436/518 |
| 6,140,044 A * | 10/2000 | Besemer et al. | 435/6 |
| 6,171,797 B1 | 1/2001 | Perbost | |
| 6,180,351 B1 | 1/2001 | Cattell | |
| 6,227,372 B1 * | 5/2001 | Thomas et al. | 206/725 |
| 6,232,072 B1 | 5/2001 | Fisher | |
| 6,242,266 B1 | 6/2001 | Schleifer et al. | |
| 6,245,297 B1 * | 6/2001 | Kowallis | 422/66 |
| 6,284,173 B1 * | 9/2001 | Austin et al. | 264/102 |
| 6,323,043 B1 | 11/2001 | Caren et al. | |
| 6,329,143 B1 | 12/2001 | Stryer et al. | |
| 6,448,089 B1 * | 9/2002 | Vuong | 436/164 |
| 6,474,475 B1 * | 11/2002 | Bjork | 206/725 |
| 6,474,477 B1 * | 11/2002 | Chang | 206/725 |

FOREIGN PATENT DOCUMENTS

| | | | |
|---|---|---|---|
| JP | 4-9666 | * | 1/1992 |
| JP | 2002317296 A | * | 10/2002 |

OTHER PUBLICATIONS

Two abstracts for JP 2002-317296.*

* cited by examiner

AUTOMATION-OPTIMIZED MICROARRAY PACKAGE

TECHNICAL FIELD

The present invention relates to microarrays, also called molecular arrays and biochips, and relates, in particular, to a method and system for packaging microarrays economically, securely, efficiently, and in a way that facilitates automated processing and scanning.

BACKGROUND OF THE INVENTION

Microarrays are widely used and increasingly important tools for rapid hybridization analysis of sample solutions against hundreds or thousands of precisely ordered and positioned features on the active surfaces of microarrays that contain different types of molecules. Microarrays are normally prepared by synthesizing or attaching a large number of molecular species to a chemically prepared substrate such as silicone, glass, or plastic. Each feature, or element, on the active surface of the microarray is defined to be a small, regularly-shaped region on the surface of the substrate. The features are arranged in a regular pattern. Each feature may contain a different molecular species, and the molecular species within a given feature may differ from the molecular species within the remaining features of the microarray. In one type of hybridization experiment, a sample solution containing radioactively, fluorescently, or chemoluminescently labeled molecules is applied to the active surface of the microarray. Certain of the labeled molecules in the sample solution may specifically bind to, or hybridize with, one or more of the different molecular species in one or more features of the microarray. Following hybridization, the sample solution is removed by washing the surface of the microarray with a buffer solution, and the microarray is then analyzed by radiometric or optical methods to determine to which specific features of the microarray the labeled molecules are bound. Thus, in a single experiment, a solution of labeled molecules can be screened for binding to hundreds or thousands of different molecular species that together compose the microarray. Microarrays commonly contain oligonucleotides or complementary deoxyribonucleic molecules to which labeled deoxyribonucleic acid and ribonucleic acid molecules bind via sequence-specific hybridization.

Generally, radiometric or optical analysis of the microarray produces a scanned image consisting of a two-dimensional matrix, or grid, of pixels, each pixel having one or more intensity values corresponding to one or more signals. Scanned images are commonly produced electronically by optical or radiometric scanners and the resulting two-dimensional matrix of pixels is stored in computer memory or on a non-volatile storage device. Alternatively, analog methods of analysis, such as photography, can be used to produce continuous images of a microarray that can be then digitized by a scanning device and stored in computer memory or in a computer storage device.

Figure 1:
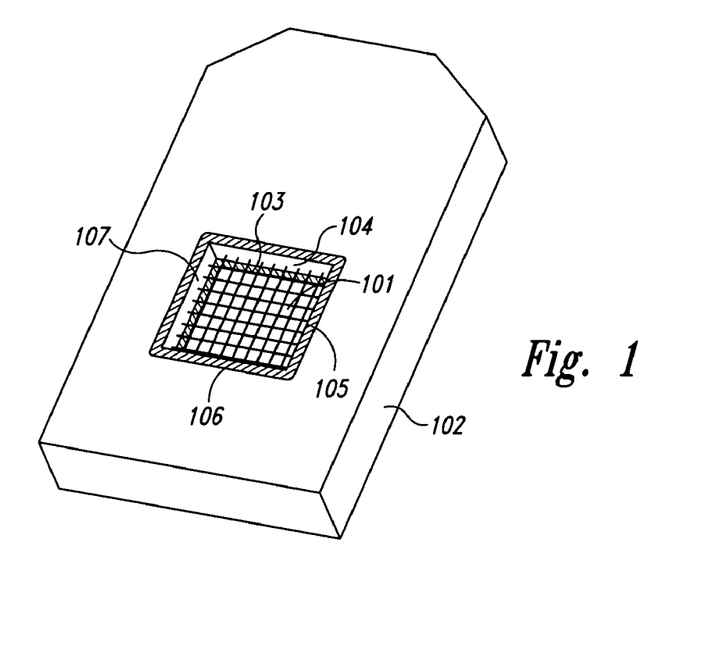
FIG. 1 shows a common, currently available commercial microarray packaged within a plastic housing.

Microarrays are often prepared on 1-inch by 3-inch glass substrates, not coincidentally having dimensions of common glass microscope slides. Commercial microarrays are often prepared on smaller substrates that are embedded in plastic housings. FIG. 1 shows a common, currently available commercial microarray packaged within a plastic housing. The microarray substrate 101 is embedded within the large, rather bulky plastic housing 102 to form an upper transparent cover over an aperture 103 within the plastic housing 102. The features that together compose the microarray are arranged on the inner, or downward surface of the substrate 101, and are thus exposed to a chamber within the plastic housing 102 comprising the microarray substrate 101 and the sides of the aperture 104–107. A transparent bottom cover may be embedded in the lower surface of the plastic housing to seal the chamber in order to create a small reaction vessel into which sample solutions may be introduced for hybridization with molecular species bound to the substrate of the microarray. Thus, the plastic housing serves to package the microarray and protect the microarray from contamination and mechanical damage during handling and storage and may also serve as a reaction chamber in which sample solutions are introduced for hybridization with features of the microarray. The plastic housing may further serve as a support for the microarray during optical or radiometric scanning of the microarray following exposure of the microarray to sample solutions. Scanning may, in certain cases, be carried out through the substrate of the microarray without a need to remove the microarray from the plastic housing.

Although currently commonly used and widely commercially available, the plastic microarray packaging shown in FIG. 1 has a number of disadvantages. First, it is necessary to seal the substrate of the microarray within the plastic housing to prevent exchange of liquids and vapors between the external environment and the reaction chamber formed by the substrate of the microarray, the plastic housing, and a bottom cover. Microarray substrates are commonly made from glass. Thus, a tight seal between the glass microarray substrate and the plastic housing is required. Unfortunately, many sealants used to seal glass to plastic may contain unreactive monomer or produce reactive surfaces that interfere chemically within the hybridization processes that need to be carried out within the reaction vessel. A second disadvantage is that glass and plastic exhibit different thermal expansion behaviors, creating high stress that may lead to glass-to-plastic bond failures during exposure of the plastic microarray packaging and embedded microarray to thermal fluctuations. A third disadvantage of the plastic packaging shown in FIG. 1 is that the plastic packaging is generally insufficiently mechanically stable to allow for reliable automated positioning of the microarray within a scanning device. As a result, scanning devices need an auto-focusing feature or other additional electromechanical systems for positioning the microarray within the scanning device. A fourth disadvantage of the plastic packaging shown in FIG. 1 is that, when the embedded microarray is scanned without removing the microarray from the plastic packaging, the thickness of the microarray substrate or of the lower transparent cover, depending from which side of the package the microarray is scanned, must have a relatively precise and uniform thickness so that the microarray substrate or bottom cover is not a source of uncontrolled error during the scanning process. Manufacturing either the microarray substrate or bottom cover to the required precision and uniformity adds to the cost of the microarray/plastic housing module. In general, fully automated manufacture of the plastic housing and embedded microarray is both complex and difficult. A final disadvantage of the plastic packaging for the microarray shown in FIG. 1 is that the microarray/plastic housing module is primarily designed for individual handling, and lacks features that would facilitate automated positioning, hybridization, and scanning of the microarray/plastic housing modules. Thus, designers, manufacturers, and users of microarrays have recognized the need for a more economical packaging method and system for microarrays with features that facilitate automated processing and handling of microarrays.

SUMMARY OF THE INVENTION

One embodiment of the present invention is a linear pocket strip comprising a series of pockets, or cells, into each pocket of which a microarray can be positioned. The pockets, and microarrays contained within the pockets, are covered by a second cover strip that can be heat sealed to the first plastic strip so that each microarray is positioned within a tightly sealed reaction chamber formed by bonding the cover strip to the pocket strip, the resulting linear series of reaction chambers called a "microarray strip." Membrane septa can be affixed to, or embedded within, the cover strip to provide resealable ports through which sample solutions or gasses can be introduced into each reaction chamber. The microarray strip may include one or more linear sequences of regularly-spaced tractor feed perforations, or other features that can be automatically sensed, to allow for precise mechanical translation and positioning of the embedded microarrays within a mechanical device. Thus, following heat sealing, the pocket and cover strips, and microarrays embedded within sealed reaction chambers formed by the pocket and cover strips, provide a regularly-spaced sequence of packaged microarrays that together compose a microarray strip. The linear sequence of packaged microarrays can be fed through various automated systems for processing and scanning, and can be rolled onto reels for storage and shipment.

DETAILED DESCRIPTION OF THE INVENTION

One embodiment of the present invention is a linear sequence of regularly-spaced, tightly sealed microreaction chambers that each contains a precisely positioned and oriented microarray, called a "microarray strip." The microarray strip further includes tractor feed perforations or other regularly spaced mechanical or optical features that allow the microarray strip, and the microarray contained within the microarray strip, to be mechanically translated and precisely positioned within various automated electromechanical systems. A microarray strip may also serve as a sequence of economical and reliable storage chambers and as packaging for storing, handling, and transporting microarrays contained within the microarray strip. The microarray strip may be rolled onto reels for compact and reliable storage of microarrays.

Figure 2:
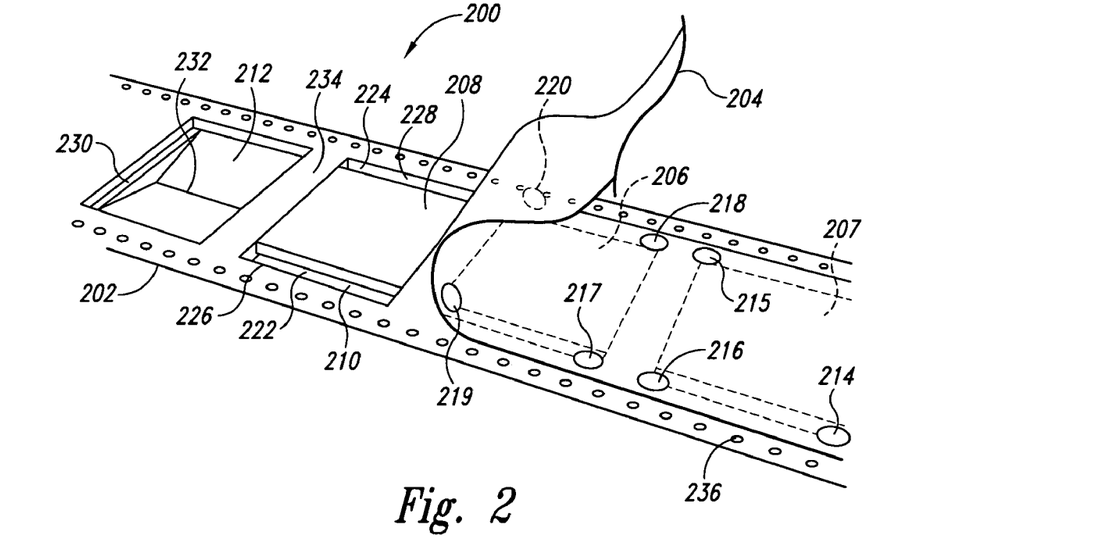
FIG. 2 shows a microarray strip.

FIG. 2 shows a microarray strip that represents one embodiment of the present invention. The microarray strip 200 comprises a pocket strip 202 and cover strip 204. The microarray strip 200 in FIG. 2 is shown during manufacture as the cover strip 204 is being laid down along the top surface of the pocket strip 202 to create sealed reaction chambers 206–207. A microarray 208 has been inserted into a pocket 210 of the pocket strip 202 which will be next covered by the cover strip 204 during the manufacturing process. An additional empty pocket 212, into which a next microarray will be placed, is located to the left of pocket 210 containing microarray 208. Membrane septa 214–220 are affixed to the cover strip 204 over corner regions of the sealed reaction chambers 206 and 207 to provide resealable ports through which solutions can be introduced into, and extracted from, the sealed reaction chambers. The septa are positioned above two elongated wells 222 and 224 formed by gaps between edges of an embedded microarray 208 and the sides of a pocket 226 and 228. Note that each microarray is positioned to rest on two ledges 230 (second ledge obscured in FIG. 2) to leave a gap between the microarray and the bottom 232 of the pocket in which the microarray is placed. The two linear wells 222 and 224 and the gap between the bottom active surface of the microarray and the bottom of the pocket 232 form a single continuous volume within the pocket. The ledges 230 may be designed so that the top surface of the microarray is flush with the upper surface of the pocket strip 234 or, alternatively, may be designed so that the upper surface of the microarray is recessed within each pocket to leave a gap between the upper surface of the microarray and the cover strip 204 following heat sealing of the cover strip 204 to the pocket strip 202. Generally, the active surface of the embedded microarrays, to which features are bonded, is positioned downward, and is opposite from the side of the microarray adjacent to the cover strip in the sealed reaction chambers. Both edges of the pocket strip contain a linear, regularly-spaced sequence of tractor feed perforations such as tractor perforation 236. These perforations can be enmeshed with gear-like feed rollers of various different mechanical systems to allow for automated translation of the microarray strip in a direction parallel to the length of the microarray strip and can also provide for precise mechanical positioning of the embedded microarrays within a scanning device.

Many alternative embodiments of the microarray strip can be designed and manufactured, and many different types of materials may be employed. In one embodiment, for example, the pocket strip and cover strip may be made from acrylonytrile-butodiene-styrene ("ABS") plastic and can be continuously manufactured via a vacuform process. The ABS pocket strip and cover strip can be readily heat sealed to provide a reasonably liquid-and-vapor-impermeable barrier. Alternatively, the cover strip may be sealed to the pocket strip via an adhesive sealant or may be designed to allow for mechanical sealing by application of mechanical pressure. Alternatively, both the pocket strip and cover strip may be manufactured from a plastic/metal foil laminate or other materials that provide a more robust barrier to exchange of liquid and vapor between the sealed reaction chambers and the outside environment. The septa can be affixed either to the upper surface or to the lower surface of the cover strip and can be manufactured from many different types of materials. In one embodiment, the septa are three-ply laminates comprising an interior elastomer layer sandwiched between two polyester layers. While the active surface of a microarrays is normally the lower surface, in alternative embodiments, the microarray may be positioned so that the active surface faces upward and is adjacent to the cover strip. In one embodiment, the cover strip is removed prior to scanning the microarrays, but in alternate embodiments, the microarray may be scanned through the cover strip 204 while remaining embedded within a reaction chamber. While the embodiment shown in FIG. 2 employs tractor feed perforations on both edges of the pocket strip for precise mechanical translation and positioning, many other types of positioning features may be used, including printed or molded features that can be optically scanned, dimples or bumps that can be mechanically sensed, rectangular, regularly-spaced indentations that together form a rack of a familiar rack and pinion mechanism, or another type of feature that can be mechanically, optically, electrically sensed to aid in automatic translation and positioning.

Figure 3:
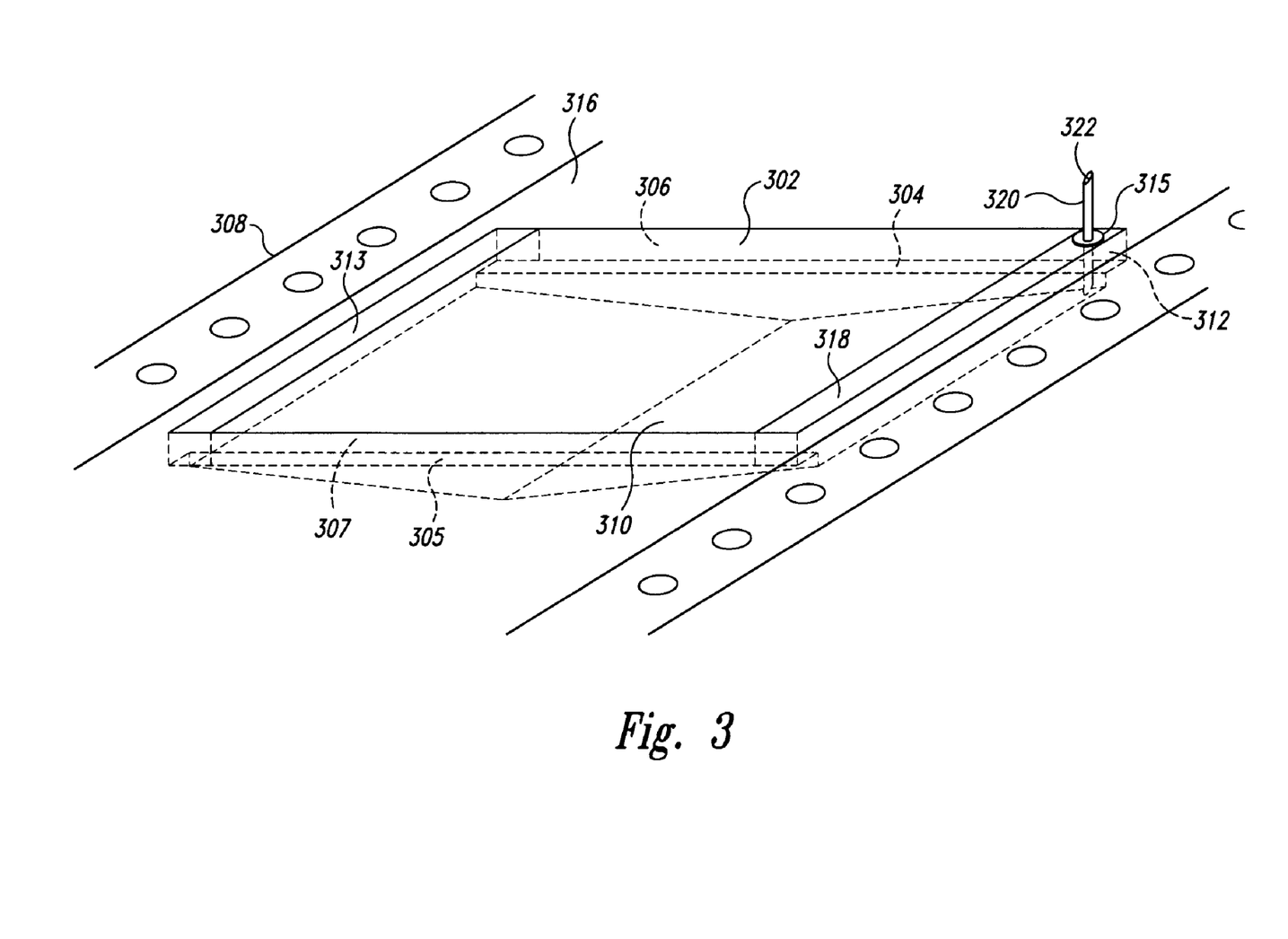
FIG. 3 shows a pocket within a pocket strip in which a microarray has been positioned.

FIG. 3 shows a pocket within the pocket strip in which a microarray has been positioned. The microarray 302 rests on two ledges 304–305 formed in the sides 306–307 of the pocket perpendicular to the edge 308 of the pocket strip. The bottom surface of the pocket 310 and the sides of the pocket 306–307 and 312–313 form a well below and adjacent to the sides of the microarray parallel to the edge of the pocket strip 308. Sample solutions can be introduced into this well and drawn under the microarray via capillary action, and can be extracted from the well and replaced with additional sample solutions or preservative solutions following a series of hybridization steps. A septum 315 affixed to the cover strip 316 is positioned above the well adjacent to the right-hand side of the microarray substrate 318. A pipette tube 320 is shown inserted through the septum 315 and cover strip 316 in order to provide a small passage 322 from the external environment into the well adjacent to the right-hand side 318 of the microarray substrate. Solutions can be introduced into, and extracted from, the well adjacent to and below the microarray substrate via the pipette tube.

Figure 4A:
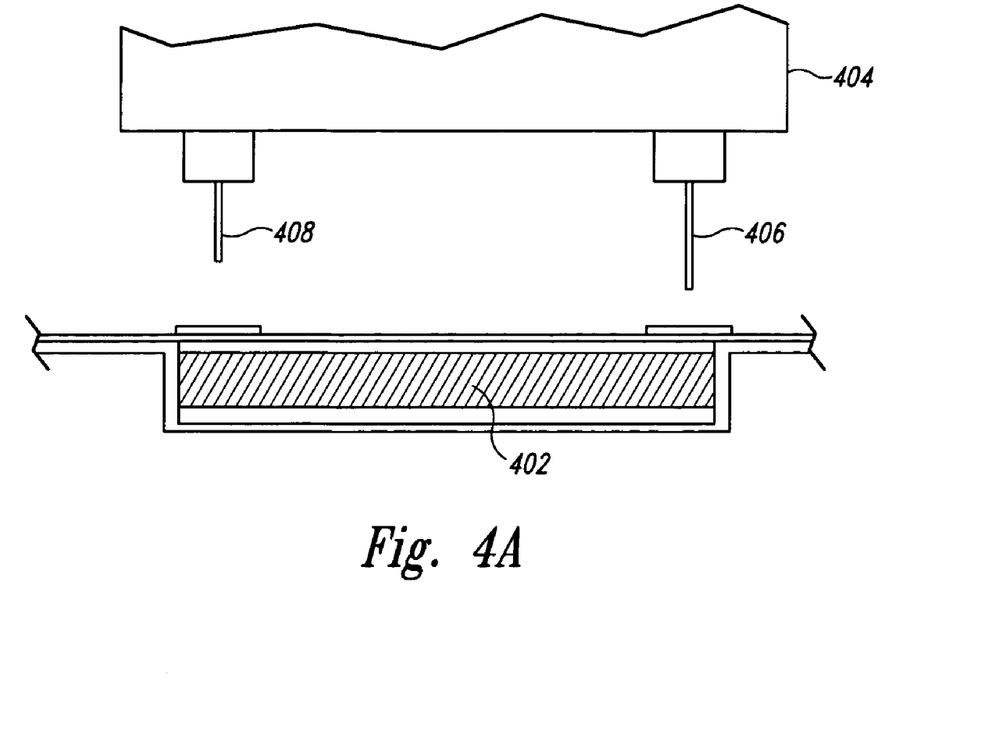
FIGS. 4A–4B illustrate automated introduction of a sample solution into a sealed reaction chamber of a microarray strip.
Figure 4B:
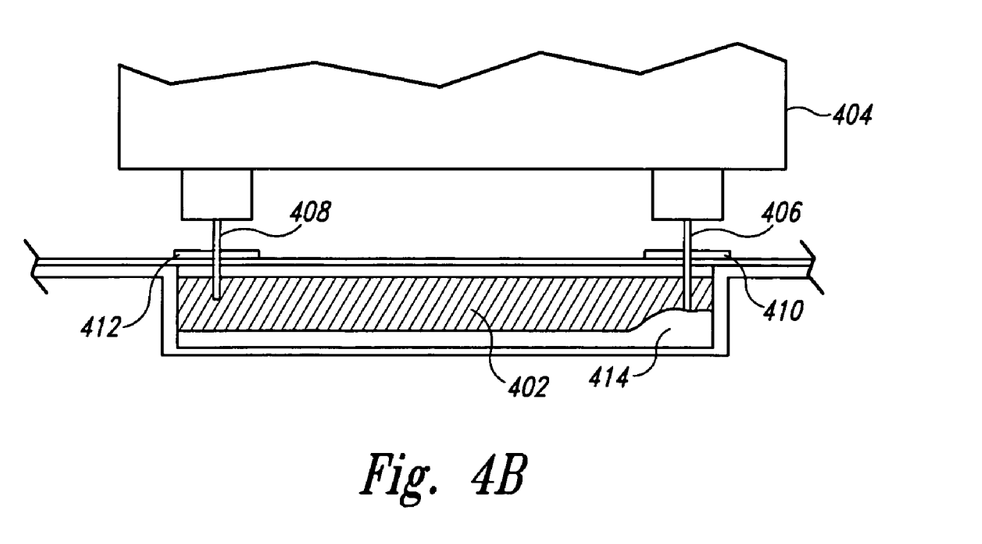

FIGS. 4A–4B illustrate automated introduction of a sample solution into a sealed reaction chamber of a microarray strip. In FIG. 4A, a reaction chamber 402 of a microarray strip is shown, in cross-section, positioned below a sample-introducing machine 404 that includes a pipette tube 406 and a vent tube 408. In FIG. 4B, the sample-introducing machine 404 has been lowered toward the reaction chamber 402 so that the pipette tube 406 and the vent tube 408 have been inserted through septa 410 and 412, respectively. The sample-introducing machine 404 introduces a sample solution 414 into the well adjacent to the side of the microarray substrate while displaced solution or air is drawn out from the reaction chamber via the vent tube 408. The sample-introducing machine 404 may continuously move between sample vessels or microtitre plates and reaction chambers of microarray strips in order to iteratively introduce sample solutions into, and remove sample solutions from, a sequence of reaction vessels in a fully automated process. Thus, the microarray strip facilitates full automation of microarray hybridization processes, and other processes that involve exchange of fluids and gasses with the interior of the reaction vessels.

As noted above, the cover strip (204 in FIG. 2) can be removed and microarrays can be extracted from their reaction chambers via automated processes. Alternatively, the cover strip may be removed from the pocket strip and the microarrays scanned or otherwise processed while remaining within pockets of the microarray strip. In yet another embodiment, the microarrays may be scanned and otherwise processed without removing the cover strip, requiring that the thickness and transparency of the cover slip be sufficiently uniform to avoid scanning errors. To facilitate automated removal of microarrays from the microarray strip, features may be molded within the pocket strip to provide clearance for grip points to facilitate automated removal of microarrays from the microarray strip. In yet another embodiment, the reaction chambers may be designed to be removed, one-by-one, from the microarray strip and handled separately. In this embodiment, perforations may be molded or pressed into the pocket strip vertical to the edge of the pocket strip between the reaction chambers to allow the pocket strips to be easily removed from the microarray strip.

Figure 5:
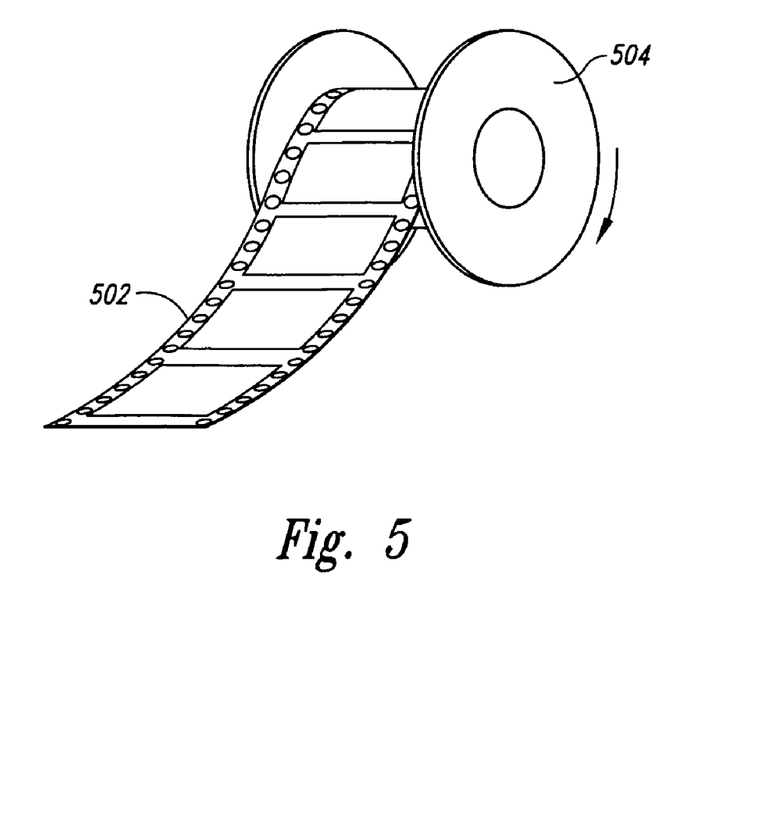
FIG. 5 illustrates rolling of a microarray strip onto a reel.

The microarray strip may be rolled onto a reel or reel for storage and transport. FIG. 5 illustrates rolling of a microarray strip onto a reel. In FIG. 5, a microarray strip 502 is shown in the process of being rolled onto a reel 504. Rolling a microarray strip onto a reel provides greater protection of the microchips embedded within the microarray strip from exposure to mechanical or environmental damage. In addition, reels of microarray strips may be easily inserted into automatic systems that can automatically unwind the reels as the microarray strip is fed into the automated systems for processing.

Figure 6:
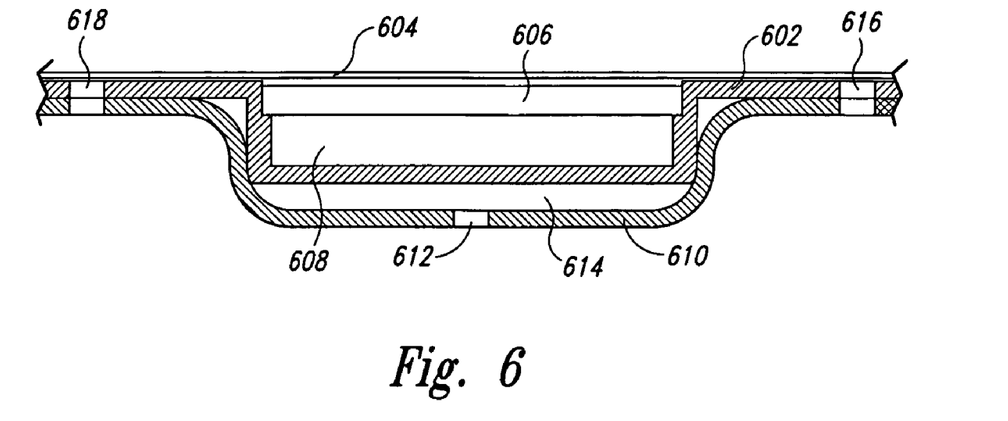
FIG. 6 shows a cross section of a microarray-strip reaction chamber packaged in a second pocket strip.

The microarray strip may be further packaged within a second pocket strip to further protect the reaction chambers from damage and environmental insults. FIG. 6 shows a cross section of a microarray-strip reaction chamber packaged in a second pocket strip. In FIG. 6, a first pocket strip 602, a cover strip 604, and a microarray 606 together form a reaction chamber 608, as described above. The reaction chamber 608 is then packaged within a second pocket tape 610, which further protects the reaction chamber from damage. The second pocket tape includes a vent hole 612 to allow air to escape during insertion of the reaction chamber 608 into the pocket 614 of the second pocket tape. Perforation holes 616 and 618 passing through both the first and second pocket tapes allow the first and second pocket tapes to be aligned and affixed to one another. Additional extra packaging may also be employed to further protect the reaction chambers within a microarray strip.

Although the present invention has been described in terms of a particular embodiment, it is not intended that the invention be limited to this embodiment. Modifications within the spirit of the invention will be apparent to those skilled in the art. For example, the individual reaction chambers can be labeled with optical or imprinted labels, such as bar codes or digitized numbers, for automated identification of individual microarrays embedded within the reaction chambers. The described embodiment is a single linear strip of reaction chambers containing embedded microarrays, but alternative embodiments may include microarray strips with multiple linear, side-by-side rows of reaction chambers. As discussed above, an almost limitless number of different types of features that facilitate mechanical translation and positioning may be employed, including the described tractor feed perforations as well as other types of regularly-spaced mechanical features or regularly-spaced optical or electromagnetic features that can be automatically sensed by sensing elements within an automated system. In the described embodiment, no particular ordering or arrangement of microarrays within a microarray strip was described. However, the microarray strip may be considered as an extended microarray comprising a large number of smaller, individual microarrays ordered within the microarray strip. Although, in the described embodiment, each pocket contains a single microarray, in alternate embodiments, pockets may each contain more than one microarray. Many different types of materials can be employed for manufacturing the pocket strip and cover strip, and reaction vessels of almost any size, shape, and volume can be fabricated. The cover strip, in the described embodiment, is transparent and the pocket strip is opaque, but, in alternate embodiments, either or both of the cover strip and pocket strip may be transparent, translucent, or opaque. Because the pocket strip and cover strip can by manufactured by continuous processes, and because microarray strips can be created from pocket strips, microarrays, septa, and cover strips by automated, continuous processes, microarray strips of arbitrary lengths can be manufactured.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A microarray strip containing microarrays, the microarray strip comprising:
   a pocket strip having a number of pockets;
   a number of microarrays, each pocket of the pocket strip containing a mircoarray; and
   a non-rigid cover strip bonded to the pocket strip to create individually sealed chambers, each sealed chamber containing a microarray.

2. The microarray strip of claim 1 wherein the pocket strip and cover strip are plastic and the cover strip is bonded to the pocket strip by heat sealing.

3. The microarray strip of claim 1 wherein the pocket strip is a polymer/metal foil laminate.

4. The microarray strip of claim 1 wherein the cover strip is a metal foil.

5. The microarray strip of claim 1 further including regularly spaced features that facilitate automatic translation and positioning of the microarray strip.

6. The microarray strip of claim 5 wherein the regularly spaced features comprise two sets of tractor feed perforations along each edge of the microarray strip.

7. The microarray strip of claim 5 wherein the regularly spaced features comprise regularly spaced optical features that can be detected by an optical detector or sensor.

8. The microarray strip of claim 5 wherein the regularly spaced features comprise regularly spaced features that engage with complementary features of a mechanical translation and positioning mechanism.

9. The microarray strip of claim 5 wherein the regularly spaced features comprise regularly spaced electromechanical features that can be detected by sensors within an electromechanical translation and positioning mechanism.

10. The microarray strip of claim 5 wherein the regularly spaced features comprise regularly spaced features that can be detected by sensors to direct an electromechanical translating and positioning mechanism to translate and position the microarray strip.

11. The microarray strip of claim 1 wherein the cover strip is bonded to the pocket strip via an adhesive sealant.

12. The microarray strip of claim 1 wherein the cover strip is bonded to the pocket strip via mechanical force applied to complementary molded features of the pocket strip and cover strip.

13. The microarray strip of claim 1 wherein the sealed chambers prevent exchange of liquid and vapor phase substances between the interior of the sealed chambers and the external environment.

14. The microarray strip of claim 1 wherein each pocket has molded features for positioning and orienting a microarray within the pocket.

15. The microarray snip of claim 1 wherein, following of insertion of a microarray into a pocket and bonding of a cover strip over the pocket, a gap remains between the upper surface of the microarray and the inner surface of the cover strip.

16. The microarray strip of claim 1 wherein, following of insertion of a microarray into a pocket, gaps remain between surfaces of the microarray and the bottom and side surfaces of the pocket to create a well into which solutions can be introduced.

17. The microarray strip of claim 16 further including one or more septa affixed to a surface of the cover strip directly above the well, providing resealable ports through which solutions and gasses can be introduced into the well and through which solutions and gasses can be extracted from the well.

18. A method for packaging a number of microarrays, the method comprising:
   providing a pocket strip having a series of pockets;
   positioning the microarrays into pockets of the pocket strip; and
   bonding a non-rigid cover strip onto the pocket strip to seal the microarrays individually within the pockets, thereby creating a microarray strip.

19. The method of claim 18 further including providing regularly spaced features along the microarray strip that are employed to translate and position the microarray strip within automated systems.

20. The method of claim 18 further including providing septa affixed to the cover strip as resealable ports for introducing solutions and gasses into, and extracting solutions and gasses from, the sealed pockets containing microarrays.

21. The method of claim 18 further including providing support features within the pockets of the microarray strip array for positioning and orienting microarrays within the pockets.

22. The microarray strip of claim 1 wherein said microarray strip may be rolled onto a reel.

23. The method of claim 18, further comprising rolling said microarray strip onto a reel.

* * * * *

UNITED STATES PATENT AND TRADEMARK OFFICE
CERTIFICATE OF CORRECTION

PATENT NO.        : 7,112,305 B2
APPLICATION NO.   : 09/775375
DATED             : September 26, 2006
INVENTOR(S)       : McEntee et al.

It is certified that error appears in the above-identified patent and that said Letters Patent is hereby corrected as shown below:

In column 7, line 29, in Claim 1, delete "mircoarray" and insert -- microarray --, therefor.

Signed and Sealed this

Twenty-third Day of January, 2007

JON W. DUDAS
*Director of the United States Patent and Trademark Office*